(12) United States Patent
Cui et al.

(10) Patent No.: US 9,074,867 B2
(45) Date of Patent: Jul. 7, 2015

(54) FLATNESS MEASURING APPARATUS

(71) Applicants: SHENZHEN FUTAIHONG PRECISION INDUSTRY CO., LTD., Shenzhen (CN); FIH (Hong Kong) Limited, Kowloon (CN)

(72) Inventors: Jin-Shan Cui, Shenzhen (CN); Qiang Mei, Shenzhen (CN); Ming Li, Shenzhen (CN); Hong-Wei Zhang, Shenzhen (CN); Jian-Ping Jin, Shenzhen (CN); Sheng Wu, Shenzhen (CN); Jer-Sheng Lee, New Taipei (TW)

(73) Assignees: SHENZHEN FUTAIHONG PRECISION INDUSTRY CO., LTD., Shenzhen (CN); FIH (HONG KONG) Limited, Kowloon (HK)

( * ) Notice: Subject to any disclaimer, the term of this patent is extended or adjusted under 35 U.S.C. 154(b) by 152 days.

(21) Appl. No.: 13/956,624

(22) Filed: Aug. 1, 2013

(65) Prior Publication Data

US 2014/0182153 A1  Jul. 3, 2014

(30) Foreign Application Priority Data

Dec. 29, 2012 (CN) .......................... 2012 1 0588557

(51) Int. Cl.
*G01B 5/28* (2006.01)
*G01B 3/34* (2006.01)

(52) U.S. Cl.
CPC . *G01B 3/34* (2013.01); *G01B 5/285* (2013.01)

(58) Field of Classification Search
CPC ........... G01B 3/34; G01B 5/061; G01B 5/285
USPC ............ 33/1 BB, 501.02, 533, 549, 701, 783, 33/832, 833
See application file for complete search history.

(56) References Cited

U.S. PATENT DOCUMENTS

| 5,014,439 A * | 5/1991 | Butzin et al. ..................... 33/533 |
| 6,275,032 B1 * | 8/2001 | Iwata et al. ...................... 33/533 |
| 6,971,182 B1 * | 12/2005 | Guffey et al. ..................... 33/555 |
| 7,335,280 B2 * | 2/2008 | Lampi et al. ..................... 33/533 |
| 8,359,761 B2 * | 1/2013 | Shindo et al. ............... 33/501.02 |
| 2003/0101608 A1 * | 6/2003 | McCune et al. ................. 33/533 |
| 2012/0096727 A1 * | 4/2012 | Zhang et al. .................... 33/552 |
| 2014/0026430 A1 * | 1/2014 | Xu et al. ......................... 33/549 |
| 2014/0033555 A1 * | 2/2014 | Lu et al. .......................... 33/832 |

* cited by examiner

*Primary Examiner* — G. Bradley Bennett
(74) *Attorney, Agent, or Firm* — Novak Druce Connolly Bove + Quigg LLP

(57) ABSTRACT

A flatness measuring apparatus includes a measuring assembly and a movable assembly. The measuring assembly includes a measuring unit. The measuring unit includes a supporting base, a loading block, and a limiting block mounted above the supporting base. The supporting base defines a receiving hole. The loading block is removably received in the receiving hole. The loading block is coplanar with the supporting base and cooperatively defines a limiting channel. A distance between the limiting block and the supporting base is substantially the same as a maximum allowable height of a workpiece, thereby only allowing qualified workpieces to slide therethrough and catching unqualified workpieces. The movable assembly connects to the measuring assembly to drive the loading block to disengage from the receiving hole and make the unqualified workpieces drop down from the measuring unit.

14 Claims, 4 Drawing Sheets

FLATNESS MEASURING APPARATUS

BACKGROUND

1. Technical Field

The present disclosure relates to flatness measuring apparatuses, and particularly to a flatness measuring apparatus for measuring surface flatness of workpieces.

2. Description of Related Art

Some types of workpieces, such as box shaped workpieces produced by a punching machine, used in electronic device need to have good surface flatness. The workpieces are sent through a channel defined by an inclined plate and a limiting block mounted over the inclined plate. A width of a space between the limiting block and the inclined plate only allows workpieces with a height less than the maximum allowable height to slide through. The qualified workpieces with an acceptable flatness can pass through the channel. Therefore, unqualified workpieces having a height greater than the maximum allowable height are caught by the limiting block. However, the unqualified workpieces that get caught between the inclined plate and the limiting block need to be taken out by hand, which slows down productivity and efficiency of measuring subsequent workpieces.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
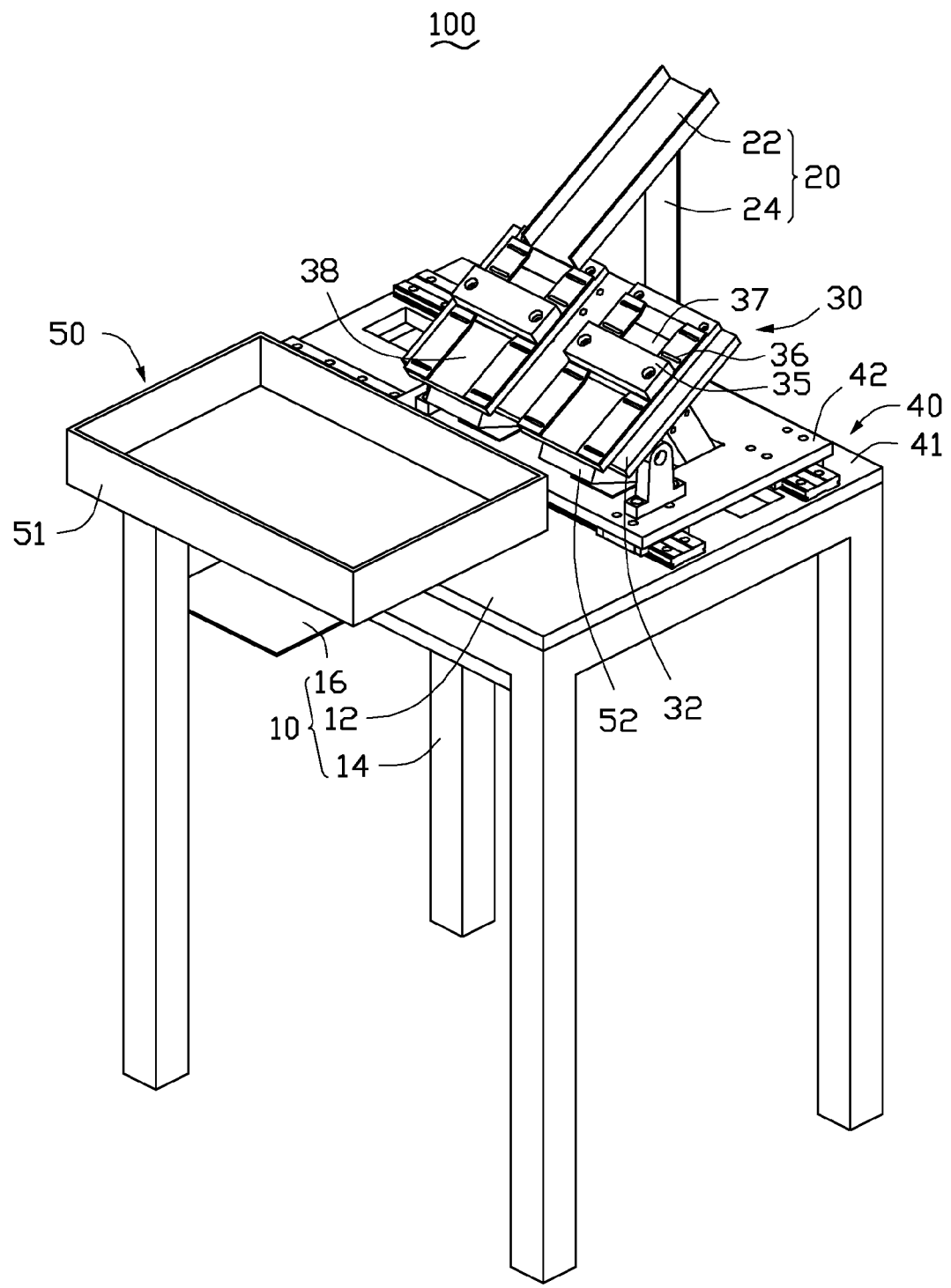
FIG. 1 is an assembly view of an exemplary embodiment of a flatness measuring apparatus.
Figure 2:
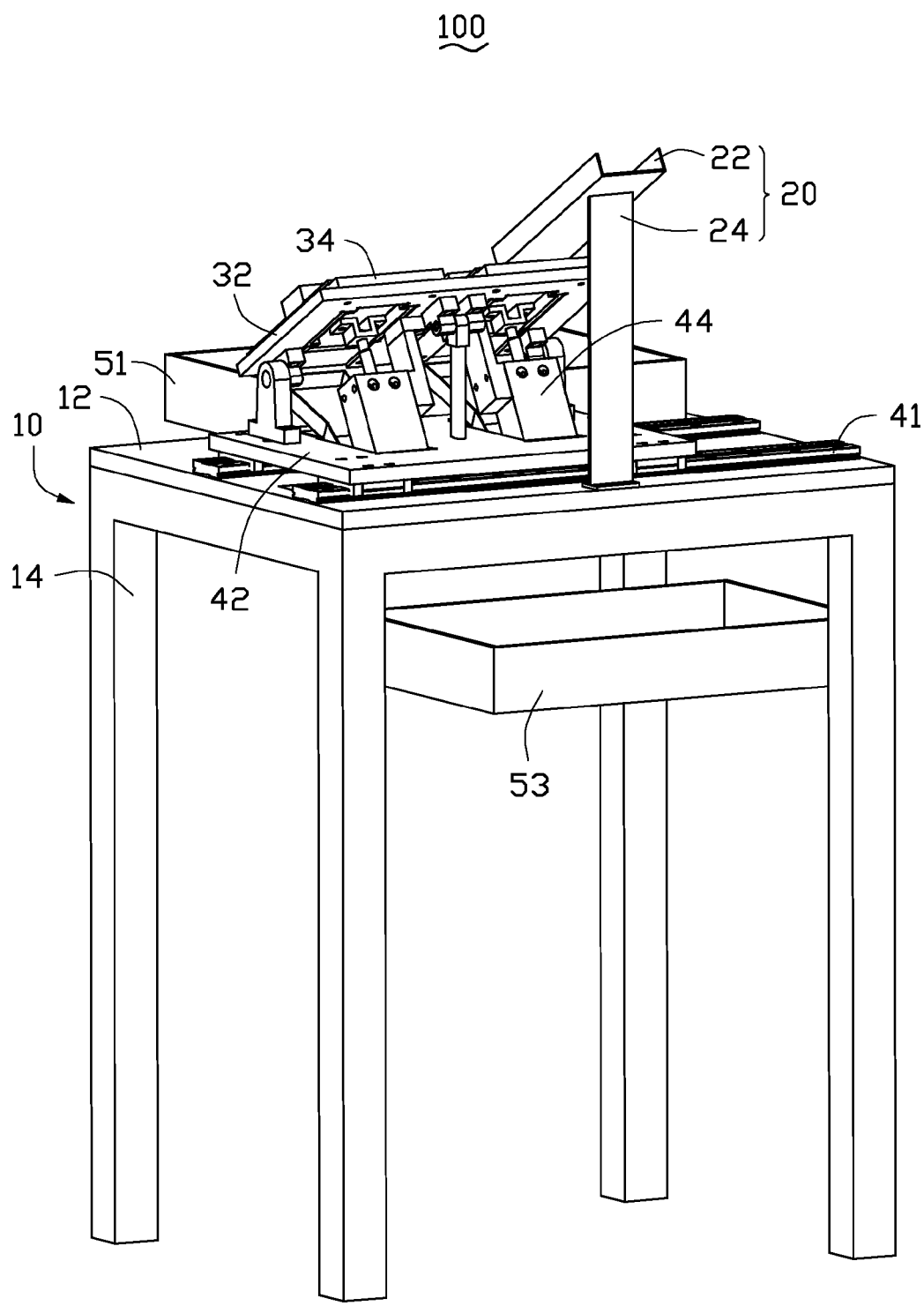
FIG. 2 is similar to FIG. 1 but viewed from another aspect.

FIGS. 1 and 2 show an exemplary embodiment of a flatness measuring apparatus 100 for measuring surface flatness of workpieces and sorting unqualified workpieces and qualified workpieces. The flatness measuring apparatus 100 includes a base body 10, a guiding assembly 20, a measuring assembly 30, a movable assembly 40, and a storage assembly 50.

Figure 3:
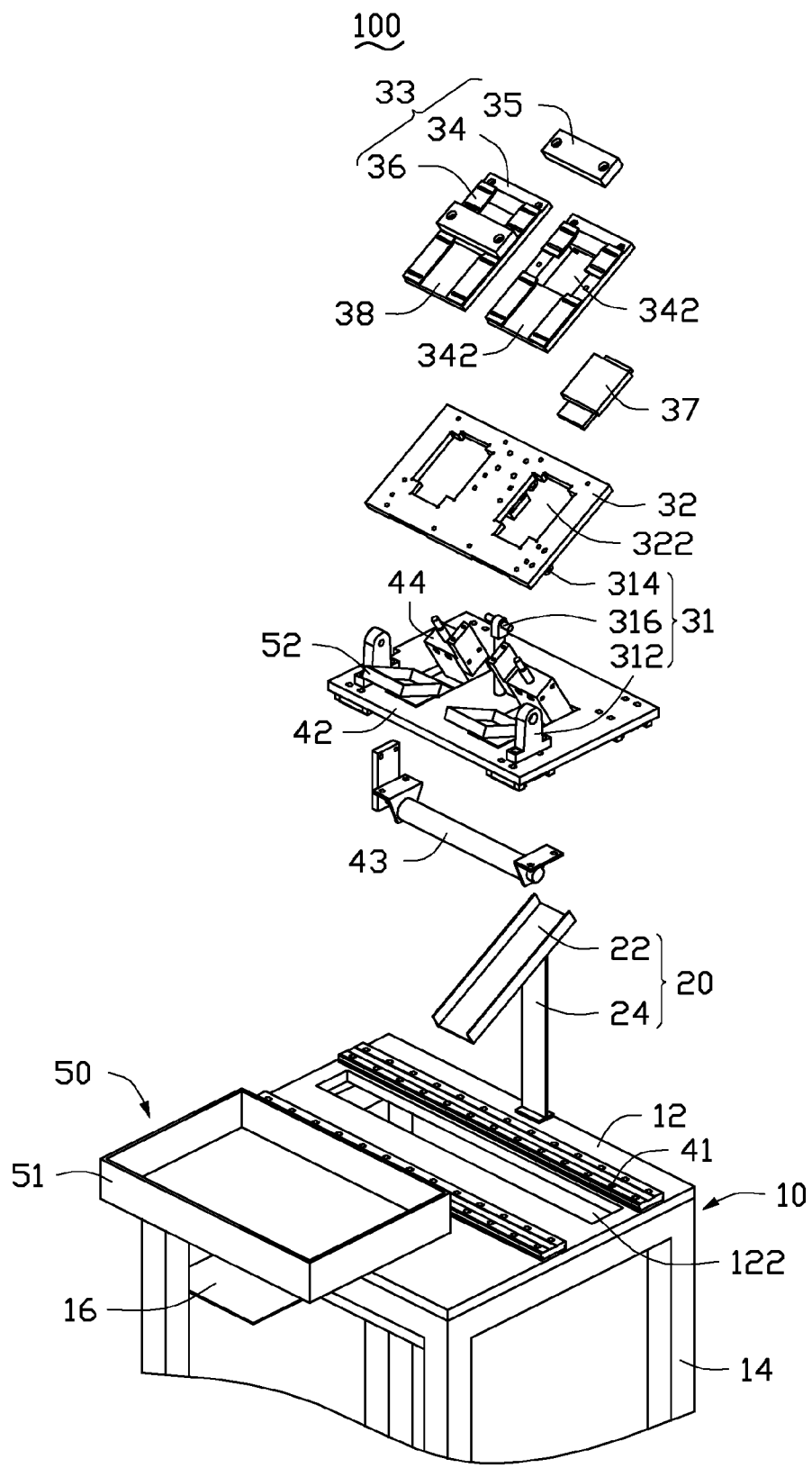
FIG. 3 is an exploded view of the flatness measuring apparatus of FIG. 1.
Figure 4:
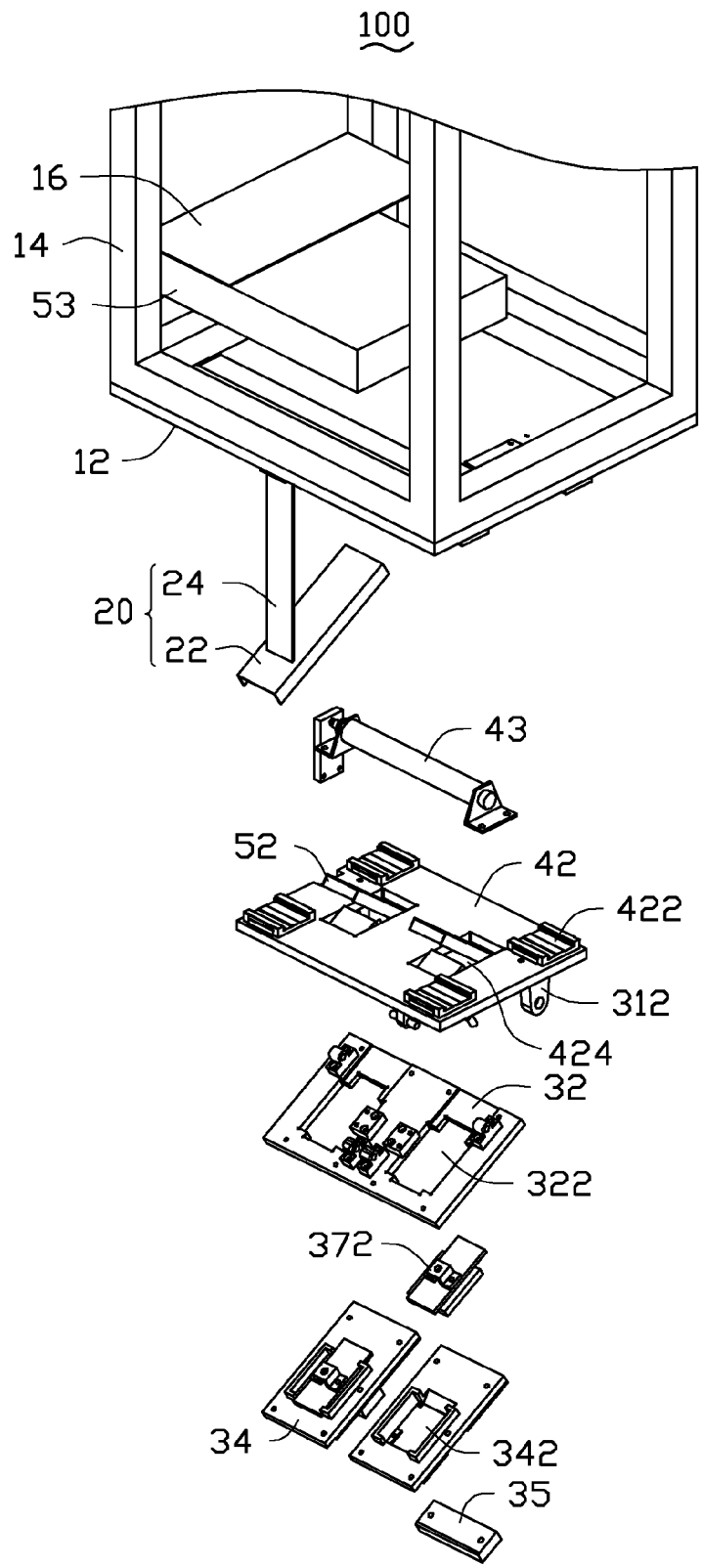
FIG. 4 is similar to FIG. 3 but viewed from another aspect.

Referring to FIGS. 3 and 4, the base body 10 includes a work platform 12, four supporting legs 14, and a holding platform 16. The work platform 12 is a substantially rectangular plate, which defines an opening 122. In the exemplary embodiment, the four supporting legs 14 are respectively located at four corners of the work platform 12. The four supporting legs 14 are of equal height to ensure an even leveled work platform 12. The supporting platform 16 is mounted between two adjacent supporting legs 14.

The guiding assembly 20 is mounted on one side of the work platform 12. The guiding assembly 20 includes a leading channel 22 and a brace 24. The brace 24 supports one end of the leading channel 22. Thus, the leading channel 22 is inclined at an angle toward the work platform 12. One end of the leading channel 22 adjacent to the side of the work platform 12 connects to a discharge port of a punching machine (not shown), thereby allowing workpieces produced by the punching machine to directly slide into the leading channel 22.

The measuring assembly 30 includes a holding unit 31, a supporting board 32, and two measuring units 33 mounted on the supporting board 32. The holding unit 31 includes two holding legs 312, two connecting blocks 314, and a holding post 316. The two connecting blocks 314 are respectively attached to two opposite ends of the supporting board 32. Each connecting block 314 is rotatably mounted to one of the holding legs 312, thereby rotatably mounting the supporting board 32 to the two holding legs 312. The holding post 316 supports one side of the supporting board 32 away from the two connecting blocks 314. Thus, the supporting board 32 is inclined at an angle to the work platform 12. In one examplary embodiment, the angle between the supporting board 32 and the work plateform 12 is identical with the angle between the leading channel 22 and the work plateform 12

The supporting board 32 defines two engagement holes 322 spaced from each other. Each measuring unit 33 is mounted above one of the engagement holes 322. The two measuring units 33 have substantially the same structures.

Each measuring unit 33 includes a supporting base 34, a limiting block 35, and two sensors 36. In one of the measuring units 33, the supporting base 34 is located above a corresponding engagement hole 322 and defines a receiving hole 342. Each measuring unit 33 further comprises a loading block 37, which is coplanar with the supporting base 34. The loading block 37 and the supporting base 34 cooperatively define a limiting channel 38 to allow the workpieces to slide therethrough. A shape of the loading block 37 corresponds to the receiving hole 342 to allow the loading block 37 to be removably fitted into the receiving hole 342. The limiting channel 38 is aligned with one end of the leading channel 22 away from the brace 24, to allow workpieces to slide therethrough. One surface of the loading block 37 opposite to the supporting base 34 has a connecting member 372.

The limiting block 35 is mounted over the limiting channel 38 and is positioned above the loading block 37. A distance between the limiting block 35 and a bottom of the limiting channel 38 is substantially the same as a maximum allowable height of a workpiece. Thus, workpieces having a height less than the allowable height range are able to freely slide through the limiting channel 38, and workpieces having a height greater than the maximum allowable height will be caught by the limiting block 35.

The two sensors 36 are mounted on one side of the limiting block 35 adjacent to the leading channel 22 and above the loading block 37. The two sensors 36 may be sensing fibers, for example. The two sensors 36 sense a time duration of a workpiece that is caught by the limiting block 35. The two sensors 36 are located on two opposite sides of the limiting channel 38.

The movable assembly 40 includes two sliding rails 41, a movable board 42, a horizontal cylinder 43, and two supporting cylinders 44. Both the horizontal cylinder 43 and the two supporting cylinders 44 have a space in which a piston travels in an engine.

The two sliding rails 41 are parallelly mounted on the work platform 12 and are adjacent to the opening 122. The movable board 42 is slidably mounted on the two sliding rails 41 and located above the opening 122.

The movable board 42 includes guiding blocks 422 that engage with the sliding rails 41 to allow the movable board 42 to slide along the sliding rails 41. The movable board 42 includes a top surface and a bottom surface opposite to the top surface. In the exemplary embodiment, the movable board 42 has four guiding blocks 422 respectively mounted on four corners of the bottom surface of the movable board 42. The movable board 42 further defines two through holes 424 spaced from each other. The holding unit 31 is attached to the top surface of the movable board 42 to support the measuring assembly 30 above the movable board 42.

The horizontal cylinder 43 has one end fixed on a bottom surface of the work platform 12, and an opposite end extending through the opening 122 and fixed to the movable board 42. The horizontal cylinder 43 is able to drive the movable board 42 to slide along the sliding rails 41.

Each supporting cylinder 44 has one end mounted on the movable board 42, and an opposite end connecting to the connecting member 372 of a corresponding loading block 37. Each supporting cylinder 44 either drives the loading block 37 into the receiving hole 342 or moves the loading block 37 away from the receiving hole 342.

The storage assembly 50 includes a first storage box 51, two transmission channels 52, and a second storage box 53. The first storage box 51 and the guiding assembly 20 are respectively located on two opposite sides of the supporting bases 34. The first storage box 51 is located on the work platform 12 and aligned with the limiting channel 38, for catching workpieces sliding out from the leading channel 22.

Each transmission channel 52 is mounted on the movable board 42, and extends through the through hole 424 and the opening 122 in that order. Each transmission channel 52 is located below a corresponding loading block 37, thereby guiding workpieces slide from the loading block 37 slide to the second storage box 53. The second storage box 53 is located on the supporting platform 16 of the base body 10.

In use, the flatness measuring apparatus 100 is positioned adjacent to one side of the punching machine. One end of the leading channel 22 away from the work platform 12 connects to the discharge port of the punching machine, and one of the measuring units 33 is positioned at the other end of the leading channel 22. Thus, workpieces produced by the punching machine slide from the discharge port into the limiting channel 38. Since the distance between each limiting block 35 and the bottom wall of the corresponding limiting channel 38 is substantial the same as the maximum allowable height of a workpiece, a workpiece with a height less than the allowable range passes through the limiting channel 38 and slides into the first storage box 51. Therefore, the qualified workpieces having a height less than the allowable height range are stored in the first storage box 51.

If a height of a workpiece is greater than the maximum allowable height, the workpiece gets caught by the limiting block 35. At this moment, the workpiece is also located between a corresponding pair of sensors 36. When the two sensors 36 sense that the workpiece is idle longer than a predetermined time, the corresponding supporting cylinder 44 drives the loading block 37 to disengage from the receiving hole 342 and move toward the movable board 42. In this way, the workpiece slides into the second storage box 53 via the transmission channel 52. Therefore, unqualified workpieces are stored in the second storage box 53, and qualified workpieces are separated from unqualified workpieces. At the same time, the horizontal cylinder 43 drives the movable board 42 to position another measuring unit 33 in front of the leading channel 22, thereby allowing workpieces to continue to slide from the punching machine while the unqualified workpiece is idle and being sensed by the sensors 36.

The flatness measuring apparatus 100 is high automation and easy to operate. Furthermore, the flatness measuring apparatus 100 saves manpower and time.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A flatness measuring apparatus comprising:
    a measuring assembly comprising a measuring unit, the measuring unit comprising a supporting base, a loading block, and a limiting block mounted above the supporting base; the supporting base defining a receiving hole, the loading block being removable engaged in the receiving hole; the loading block being coplanar with the supporting base and cooperatively defining a limiting channel; the distance between the limiting block and the limiting channel being substantially the same as a maximum allowable height of a workpiece; and
    a movable assembly connected to the measuring assembly to drive the loading block to disengaged from the receiving hole.

2. The flatness measuring apparatus as claimed in claim 1, wherein the movable assembly comprises a movable board and a supporting cylinder, the supporting cylinder has one end mounted on the movable board, and an opposite end connecting to the loading block, the supporting cylinder drives the loading block into the receiving hole or moves the loading block away from the receiving hole.

3. The flatness measuring apparatus as claimed in claim 2, further comprising a base body, wherein the base body comprises a work platform, four supporting legs supporting the work platform, and a holding platform located below the work platform, the work platform defines an opening extending therethrough.

4. The flatness measuring apparatus as claimed in claim 3, further comprising a guiding assembly, wherein the guiding assembly comprises a leading channel and a brace, the brace supports one end of the leading channel, the leading channel is inclined at an angle toward the work platform.

5. The flatness measuring apparatus as claimed in claim 4, further comprising a storage assembly, wherein the storage assembly comprises a first storage box and a second storage box, the first storage box and the guiding assembly are respectively located on two opposite sides of the supporting base, the first storage box is located on the work platform and aligned with the limiting channel, the second storage box is located on the supporting platform.

6. The flatness measuring apparatus as claimed in claim 5, wherein the measuring assembly further comprises a holding unit and a supporting board; the holding unit comprises two holding legs, two connecting block, and a holding post; the two connecting blocks are respectively attached to two opposite ends of the supporting board, each connecting block is rotatably mounted to one of the holding legs to rotatably mount the supporting board on the two holding legs, the holding post supports one side of the supporting board away from the two connecting blocks, the supporting board is inclined at an angle to the work platform.

7. The flatness measuring apparatus as claimed in claim 6, further comprising two sensors mounted on the supporting base adjacent to the guiding assembly, wherein the two sensors sense a time duration of a workpiece that is caught by the limiting block and trigger the supporting cylinder driving the loading block to disengages from the receiving hole when the workpiece is idle longer than a predetermined time.

8. The flatness measuring apparatus as claimed in claim 3, wherein the measuring assembly further comprising another measuring unit away from the measuring unit, the another measuring unit and the measuring unit have substantially the same structures.

9. The flatness measuring apparatus as claimed in claim 8, wherein the movable assembly further comprises another supporting cylinder, the another supporting cylinder has one end mounted on the movable board and an opposite end connecting to the loading block of the another supporting cylinder.

10. The flatness measuring apparatus as claimed in claim 9, wherein the movable assembly further comprises two sliding rails, a movable board, a horizontal cylinder; the two sliding rails are parallelly mounted on the work platform and adjacent to the opening, the movable board is slidably mounted on the two sliding rails and located above the opening.

11. The flatness measuring apparatus as claimed in claim 10, wherein the movable board defines guiding blocks that engage with the sliding rails.

12. The flatness measuring apparatus as claimed in claim 11, wherein the movable board has four guiding blocks, which are respectively mounted on four corners of the bottom surface of the movable board.

13. The flatness measuring apparatus as claimed in claim 12, wherein the holding unit is attached to top surface of the movable board, to support the measuring assembly movable located above the movable board.

14. The flatness measuring apparatus as claimed in claim 13, wherein the horizontal cylinder has one end fixed on a bottom surface of the work platform, and an opposite end extending through the opening and fixed to the movable board.

* * * * *